United States Patent Office 3,468,960
Patented Sept. 23, 1969

3,468,960
TETRAFLUOROBENZEN-1-4-DITHIOL AND 4,4′-DIMERCAPTO-OCTAFLUOROBIPHENYL
Richard Henry Mobbs, Avonmouth, England, assignor to Imperial Smelting Corporation (N.S.C.) Limited, a British company
No Drawing. Filed Apr. 26, 1966, Ser. No. 545,242
Claims priority, application Great Britain, Apr. 28, 1965, 17,820/65
Int. Cl. C07c 149/34
U.S. Cl. 260—609  2 Claims

ABSTRACT OF THE DISCLOSURE

The compounds tetrafluorobenzene-1,4-dithiol and 4,4′-dimercapto-octafluorobiphenyl, which can be converted to disulphonyl chlorides and the cuprous salts of which are useful for forming telomers and polymers with the repeating unit

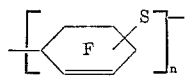

A method of preparing mono and dithiols of tetrafluorobenzene, pentafluorothiophenol and dithiols of octafluorobiphenyl comprising heating an aromatic compound corresponding to the desired thiol compound but containing lithium atoms in the positions at which it is desired to put thiol groups with elemental sulfur below about −50° C., acidifying the product and isolating the desired compound.

---

The invention relates to fluorinated aromatic compounds containing one or more thiol groups directly attached to an aromatic ring which contains at least two fluorine atoms.

The invention consists in a method of preparing fluorinated aromatic compounds containing at least one thiol group directly attached to an aromatic ring which contains from two to five fluorine atoms, which comprises treating a lithium derivative of the aromatic compound, containing at least one lithium atom with elemental sulphur.

The method is most generally useful for the preparation of monothiols and dithiols, that is to say, it is generally most feasible to work via the mono- or dilithium derivative.

Moreover, the method is of particular interest for preparing the more highly fluorinated thiols, for instance, by using the lithium derivatives of tetrafluoro- or pentafluoro-subsituted benzene.

While in general the method is applicable to compounds containing any number of aromatic rings either fused or unfused, it will generally be found convenient to work with one-, two- or three-ring compounds.

The operating temperature must be relatively low, since the lithium compounds are very reactive and unstable at room temperature. Although it is difficult to generalise, a temperature of below −50° C. is preferred for the reaction of the lithium derivative with sulphur.

The lithium compounds used in the method of the invention may be formed by one of the methods described in the literature for the preparation of lithium derivatives of polyfluoroaromatic compounds. Thus, (a) a fluoroaromatic compound containing at least two (and preferably more) fluorine atoms and containing acidic hydrogen atoms may be treated with n-butyl lithium at −70° to −50° (Harper, Soloski, and Tamborski, J. Org. Chem., 1964, 29, 2385), or
(b) a halogen-metal interchange reaction is caused to occur, for example, by treating 1,4-dibromotetrafluorobenzene with butyl lithium, or
(c) an aromatic compound containing higher halogen and fluorine atoms only is caused to react with metallic lithium in a suitable form, for example, with lithium amalgam (Coe, Stephens and Tatlow, J. Chem. Soc., 1962, 3227).

Two highly fluorinated thiols, i.e. containing at least 3 fluorine atoms are already known, and are readily accessible by reacting the corresponding fluoroaromatic compound with sodium hydrosulphide in pyridine, or some other solvent, when a fluorine atom is displaced by the —SH group. Thus, hexafluorobenzine gives pentafluorothiophenol, and pentafluorobenzine gives 2,3,5,6-tetrafluorothiophenol (Robson, Stacey, Stephens and Tatlow, J. Chem. Soc., 1960, 4754). It has not proved to be possible to introduce a second thiol group into pentafluorothiophenol by treatment with an excess of sodium hydrosulphide. It appears that the ion $C_6F_5S^-$ is too deactivated to react with the nucleophile −SH.

Thus, an important aspect of this invention is that it provides a preparative method for the preparation of tetrafluorobenzene-1,4-dithiol and other fluoroaromatic thiols which are not accessible by other syntheses.

An important feature of the invention is that it provides many new compounds per se within the class of fluoroaromatic thiols; it will be appreciated that the invention is valuable in respect of the thiols of more elaborate structure than those already known.

Thus, the invention further consists in fluorinated aromatic monothiols in which; the thiol group is attached to an aromatic ring containing at least two and at most five fluorine atoms, the ring optionally containing in addition other substituents chosen from hydrogen, low alkyl, low perfluoroalkyl, halogen other than fluorine, hydroxyl, amino, carboxyl, phenyl and substituted phenyl especially fluorinated phenyl groups, the whole compound containing one or two carbocyclic aromatic rings.

The invention still further consists in fluorinated aromatic dithiols in which, the thiol groups are attached to an aromatic ring or rings containing at least two fluorine atoms, other substituents as defined in the previous paragraph being optionally present and the compound contains one, two or three carbocyclic aromatic rings.

Typical examples of compounds which may be prepared by the method of the invention are:

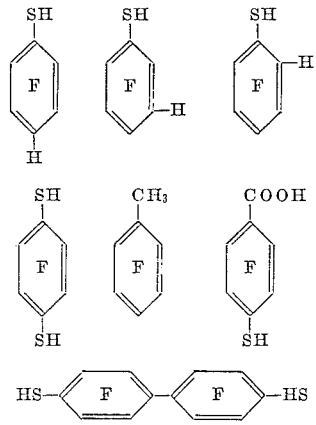

The polyfluorobenzene-monothiols of the invention are intermediates for the preparation of fluoraryl sulphonyl chlorides which are useful for introducing a polyfluoroaryl group into an aromatic compound by the arylation procedure described in British Patent No. 964,543 and British Patent No. 976,438 to provide fluorinated compounds with good thermal stability and which are useful as heat-exchange fluids, dielectric media, hydraulic liquids, lubricants, etc.

Another important use of the monothiols is as intermediates for the preparation of sulphonamide derivatives containing fluorine atoms in the nucleus. These sulphonamides can be further reacted with bases such as piperidine to provide piperidinofluorobenzenesulphonamides which are valuable anticonvulsants, of especial value for the treatment of epileptic cases. For example, the compound:

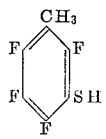

prepared in accordance with this invention, is converted into a pharmacologically active compound by the following sequence of reactions:

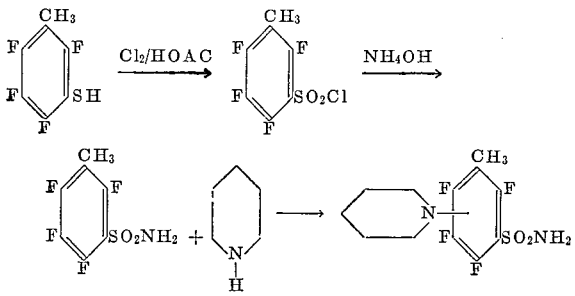

The dithiols of this invention are readily converted to cuprous salts by the action of cuprous oxide in boiling ethanol. The cuprous salts so formed are useful as intermediates for preparing telomers and polymers with the repeating unit.

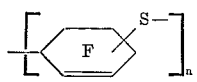

by reaction with a dibromotetrafluorobenzene in a suitable solvent such as dimethylformamide. For applications as fluids the linkages to the sulphur atoms are preferably in the meta positions. This can be achieved by using tetrafluorobenzene 1,3-dithiol and 1,3-dibromotetrafluorobenzene as monomers to the telomerisation process.

The dithiols can also be converted to disulphonyl chlorides by treatment with chlorine in acetic acid. For example, tetrafluorobenzene disulphonyl chloride decomposes on heating to give a tetrafluorophenylene diradical which can react with other aromatic compounds, such as 1,3,5-trichlorobenzene, to form aromatic compounds containing tetrafluorophenyl rings.

The invention will be further illustrated by the following nonlimiting examples:

EXAMPLE 1

(All reactions carried out in dry nitrogen)

To a stirred solution of n-butyl lithium (0.44 mole in 180 ml. pentane) and tetrahydrofuran (400 ml.) was added 1,2,4,5-tetrafluorobenzene (24.8 g., 0.17 mole) over 0.5 hour, the temperature being kept in the range —60° to —55°. After the addition the solution was kept at this temperature for 1 hour and then cooled to —70°. Dry sulphur (11.0 g., 0.34 g. atom) was then added in portions over 0.75 hour to the stirred solution at —70°. After the addition stirring was continued a further 0.5 hour and the solution was then allowed to warm to ambient temperature. The brown suspension was acidified with 6 N hydrochloric acid (500 ml.) and the upper orange-red organic layer separated off, water washed, and extracted with 5% sodium hydroxide solution (2× 225 ml.). The alkaline extracts were acidified with 6 N hydrochloric acid (120 ml.) precipitating a brown oil which was taken up in ether and dried (magnesium sulphate). Evaporation of the ether gave a brown residue (31.43 g.) which was sublimed at 80–110°/0.5 mm. to give crude dithiol (12.4 g.) and a second sublimate at 100–140°/0.2–0.3 mm. A brown resin (8.78 g.) remained. Recrystallisation of the main sublimate from aqueous ethanol and resublimation yielded very pale yellow crystals of tetrafluorobenzene-1,4-dithiol (8.70 g., 24% yield), M.P. 70–72°, 99+% pure by gas chromatography (found: C, 33.7; H, 0.9; F, 35.4. $C_6H_2F_4S_2$ requires C, 33.6; H, 0.9; F, 35.5%). An infrared spectrum showed a strong —SH band at 2590 cm.$^{-1}$ and the fluorinated ring absorption at 1475 cm.$^{-1}$.

Treatment of a sample of the dithiol (2 g.) with excess diazomethane in ether at 0° gave a theoretical yield of 1,4-bis(methylthio)tetrafluorobenzene, M.P. 90–91.5° having an infra-red spectrum identical to that of the compound prepare by the action of cuprous thiomethylate on 1,4-dibromotetrafluorobenzene, and having an undepressed melting point, on admixture with this compound, of 89.5–91.5°.

EXAMPLE 2

To a stirred solution of n-butyl lithium (0.3 mole in 140 ml. hexane) and tetrahydrofuran (300 ml.) at —65° was added a solution of 1,2,3,4-tetrafluorobenzene (45.0 g., 0.30 mole) in tetrahydrofuran (60 ml.) over 0.5 hour the temperature not rising above —60°. The solution was stirred at this temperature a further 0.75 hour, then dry sulphur (9.63 g., 0.3 g. atom) was added in portions over 0.5 hour. The solution was stirred at —60° for a further 0.5 hour and allowed to warm to ambient temperature. 6 N Hydrochloric acid (450 ml.) was added and the organic layer was separated off, water washed and dried (calcium chloride). Removal of the solvent gave a residue (57.5 g.) which was fractionally distilled to give 2,3,4,5-tetrafluorothiophenol (30.5 g., 56% yield), B.P. 144–150°, 96.4% pure by gas chromatography. Redistillation of a portion gave an analytical sample, B.P. 150–152°/766 mm. (found: C, 39.0; H, 0.9; F, 41.5. $C_6H_2F_4S$ requires C, 39.6; H, 1.1; F, 41.7%). An infrared spectrum contained absorption for —SH (2,575 cm.$^{-1}$), C—H (3,025 cm.$^{-1}$) and the fluorinated aromatic ring (1475, 1500 cm.$^{-1}$).

EXAMPLE 3

A solution of n-butyl lithium (0.30 mole in 140 ml. hexane) was added in 1 hour to a stirred solution of 1,2,3,5-tetrafluorobenzene (45.1 g., 0.30 mole) in dry tetrahydrofuran (250 ml.) at —60 to 70°. After being stirred at —70° for a further 0.5 hour dry sulphur (10 g., 0.31 g. atom) was added in portions over 0.5 hour. When addition was complete the brown solution was stirred for 2 hours then allowed to warm to ambient temperature. 6 N hydrochloric acid (450 ml.) was added and the organic layer was separated off, water washed and dried (magnesium sulphate). Removal of the solvent yielded a residue (63.5 g.) which was fractionally distilled to yield 2,3,4,6-tetrafluorothiophenol (36.5 g., 67% yield, B.P. 148–150°/756 mm., 98.3% pure by gas chromatography. Redistillation of a portion of this material gave an analytical sample, B.P. 148°/756 mm. (found: C, 39.5; H, 0.9. $C_6H_2F_4S$ requires C, 39.6; H, 1.1%). The infrared spectrum of this compound showed the presence of —SH (2,580 cm.$^{-1}$), aromatic C—H (3050 cm.$^{-1}$ and a highly fluorinated aromatic ring (1470, 1500° cm.$^{-1}$).

EXAMPLE 4

A solution of 4,4′-dihydro-octafluorobiphenyl (24.2 g., 0.08 mole) in tetrahydrofuran (40 ml.) was added in 0.5 hour to a solution of n-butyl lithium (0.163 mole in 75 ml. hexane) and tetrahydrofuran (175 ml.) at —70°. The pink suspension produced was stirred at —70° for 1 hour then dry sulphur (5.26 g., 0.164 g. atom) was added in portions over 0.75 hour. The solution was stirred at —65° to —70° for 0.5 hour and was then allowed to warm to ambient temperature. 6 N hydrochloric acid (220 ml.) was added, the organic layer was separated off, water washed, dried (calcium sulphate) and distilled yielding a pale yellow solid residue (27.5 g.), M.P. 110°–121°. A portion (4.02 g.) of this residue was recrystallised twice from aqueous ethanol to give 4,4'-dimercapto-octafluoro-biphenyl (1.03 g.), M.P. 119°–122°, undepressed in admixture with authentic material and having an identical infrared spectrum.

EXAMPLE 5

A solution of n-butyl lithium (0.109 mole in 50 ml. hexane) was added over ½ hour to a stirred solution of 2,3,5,6-tetrafluorotoluene (14.99 g., 0.09 mole) in tetrahydrofuran (75 ml.) at −70°. The solution was stirred a further 1½ hours at −70° then dry sulphur (3.94 g., 0.12 g. atom) was added over 0.25 hour. The solution was stirred at −70° for 2.5 hours then allowed to warm to ambient temperature. 6 N hydrochloric acid (125 ml.) was added, the organic layer was water washed, dried and distilled leaving a residue (23.91 g.) which was distilled at reduced pressure to give 2,3,5,6-tetrafluoro-p-thiocresol (10.65 g., 60% yield), B.P. 98°/50 mm., having an infrared spectrum identical to that of the compound prepared by treating 2,3,5,6-tetrafluorotoluene with sodium hydrogen sulphide in dimethylformamide.

I claim:
1. Tetrafluorobenzene-1,4-dithiol.
2. 4,4'-dimercapto-octafluorobiphenyl.

References Cited

Robson et al.: "J. Chem. Soc." (1960), pp. 4754–4760.
Klages et al.: "Ber.," vol. 97 (1964), pp. 735–740.
Brooke: "Tetra Letters," No. 34 (1965), 2991–2993.

CHARLES B. PARKER, Primary Examiner
D. R. PHILLIPS, Assistant Examiner

U.S. Cl. X.R.

260—79, 293.4, 438.1, 516, 543, 556, 578, 999